US008111185B2

(12) United States Patent
Teuling et al.

(10) Patent No.: US 8,111,185 B2
(45) Date of Patent: Feb. 7, 2012

(54) UNIVERSAL REMOTE CONTROL DEVICE

(75) Inventors: Sieme Teuling, Almelo (NL); Menno De Jong, Enschede (NL); Jeroen van Oorspronk, Bathmen (NL)

(73) Assignee: EchoStar Global B.V., Almelo (NL)

( * ) Notice: Subject to any disclaimer, the term of this patent is extended or adjusted under 35 U.S.C. 154(b) by 302 days.

(21) Appl. No.: 12/572,620

(22) Filed: Oct. 2, 2009

(65) Prior Publication Data

US 2010/0085209 A1 Apr. 8, 2010

(30) Foreign Application Priority Data

Oct. 3, 2008 (EP) .................................... 08165844

(51) Int. Cl.
*H04L 17/02* (2006.01)

(52) U.S. Cl. ........ 341/176; 341/173; 707/791; 707/802; 707/825; 340/9.1; 340/9.16; 340/12.22; 340/12.23; 340/12.28; 725/51

(58) Field of Classification Search .................. 341/173, 341/176; 340/9.1, 9.16, 12.22–12.28; 725/51; 707/791, 802, 825
See application file for complete search history.

(56) References Cited

U.S. PATENT DOCUMENTS

| | | | | |
|---|---|---|---|---|
| 7,525,473 | B2 * | 4/2009 | Chu et al. | 341/176 |
| 2003/0163542 | A1 * | 8/2003 | Bulthuis et al. | 709/208 |
| 2003/0189509 | A1 * | 10/2003 | Hayes et al. | 341/176 |
| 2004/0155793 | A1 | 8/2004 | Mui | |

FOREIGN PATENT DOCUMENTS

EP 2172738 * 1/2011

OTHER PUBLICATIONS

Extended European Search Report issued on Apr. 16, 2009 by the European Patent Office, 6 pages.
Singh, G. et al, "IR Database Compression Algorithm Using Optimized Key Mask," Electrical and Computer Engineering, 2008, May 4, 2008, pp. 1097-1102, XP031286136.

* cited by examiner

*Primary Examiner* — Albert Wong
(74) *Attorney, Agent, or Firm* — Dorsey & Whitney LLP

(57) ABSTRACT

A universal remote control device (100) is provided which is able to operate different electronic devices such as television sets, recorders, set top boxes, and audio systems. The universal remote control device (100) is provided with a database (10) in which control data collected from a plurality of individual physical remote control units (2) is stored in a structured manner. To enable the memory storing the database (10) to be kept small, repetitious and/or redundant control data is omitted. In addition, the database structure uses a hierarchical structure and inheritance. The control data of a physical remote in memory may be stored, therefore, in part in a child physical remote and also in one or more parent or grandparent virtual remotes. Such a structure enables control information which is common to a number of remotes to be stored in just a single occurrence.

15 Claims, 24 Drawing Sheets

| EMBEDDED NUMBER | KEY NAME |
|---|---|
| 0 | POWER |
| 1 | SELECT |
| 2 | UP ARROW |
| 3 | DOWN ARROW |
| 4 | VOLUME UP |
| 5 | VOLUME DOWN |
| 6 | MENU |
| 7 | TV / VIDEO |
| 8 | MUTE |
| 9 | GUIDE |
| 10 | RECALL |
| 11 | 0 |
| 12 | 1 |
| 13 | 2 |
| 14 | 3 |
| 15 | 4 |

| EMBEDDED NUMBER | KEY NAME |
|---|---|
| 16 | 5 |
| 17 | 6 |
| 18 | 7 |
| 19 | 8 |
| 20 | 9 |
| 21 | VIEW TV |
| 22 | CANCEL |
| 23 | RECORD |
| 24 | STOP |
| 25 | PLAY |
| 26 | PAUSE |
| 27 | FAST FORWARD |
| 28 | REWIND |
| 29 | PIP |
| 30 | SWAP |
| 31 | POSITION |

| EMBEDDED NUMBER | KEY NAME |
|---|---|
| 32 | LEFT ARROW |
| 33 | RIGHT ARROW |
| 34 | PAGE DOWN |
| 35 | PAGE UP |
| 36 | POUND |
| 37 | ASTRICS |
| 38 | DISH |
| 39 | DVR |
| 40 | INFO |
| 41 | SKIP BACK |
| 42 | SKIP FORWARD |
| 43 | SAT |
| 44 | TV |
| 45 | VCR |
| 46 | AUX |
| | |

FIG.4

| | | | | | | | | | | | | | | | | | | | | | | | | |
|---|---|---|---|---|---|---|---|---|---|---|---|---|---|---|---|---|---|---|---|---|---|---|---|---|
| POSITION | 46 | 45 | 44 | 43 | 42 | 41 | 40 | 39 | 38 | 37 | 36 | 35 | 34 | 33 | 32 | 31 | 30 | 29 | 28 | 27 | 26 | 25 | 24 | 23 |
| FLAG STATUS | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | | | | | | | | | | | | | | | | | | | | | | | | |
| POSITION | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | |
| FLAG STATUS | 0 | 0 | 1 | 1 | 1 | 1 | 1 | 1 | 1 | 1 | 1 | 1 | 0 | 0 | 1 | 0 | 0 | 1 | 1 | 0 | 0 | 1 | 1 | |

FIG. 5

| COMMAND NUMBER | KEY |
|---|---|
| 1 | POWER |
| 2 | SELECT |
| 3 | VOLUME UP |
| 4 | VOLUME DOWN |
| 5 | MUTE |
| 6 | 0 |
| 7 | 1 |
| 8 | 2 |
| 9 | 3 |
| 10 | 4 |
| 11 | 5 |
| 12 | 6 |
| 13 | 7 |
| 14 | 8 |
| 15 | 9 |

FIG.6

| COMMAND NUMBER | KEY |
|---|---|
| 1 | POWER |
| 2 | SELECT 1 |
| 3 | SELECT 2 |
| 4 | SELECT 3 |
| 5 | VOLUME UP |
| 6 | VOLUME DOWN |
| 7 | MUTE 1 |
| 8 | MUTE 2 |

FIG.7

| KEY | COMMAND BITS POSITION | 0 | 1 | 2 | 3 | 4 | 5 | 6 | 7 |
|---|---|---|---|---|---|---|---|---|---|
| 0 | | 0 | 0 | 1 | 0 | 1 | 0 | 0 | 0 |
| 1 | | 0 | 0 | 1 | 0 | 1 | 0 | 0 | 1 |
| 2 | | 0 | 0 | 1 | 0 | 1 | 0 | 1 | 0 |
| 3 | | 0 | 0 | 1 | 0 | 1 | 0 | 1 | 1 |
| 4 | | 0 | 1 | 1 | 0 | 1 | 1 | 0 | 0 |

FIG.9

| KEY | COMMAND BITS POSITION | 0 | 1 | 2 | 3 |
|---|---|---|---|---|---|
| 0 | | 0 | 0 | 0 | 0 |
| 1 | | 0 | 0 | 0 | 1 |
| 2 | | 0 | 0 | 1 | 0 |
| 3 | | 0 | 0 | 1 | 1 |
| 4 | | 1 | 1 | 0 | 0 |

FIG.10

| | | |
|---|---|---|
| TV REMOTE 0: | CodeID | OTHER REMOTE DATA |
| TV REMOTE 1: | CodeID | OTHER REMOTE DATA |
| TV REMOTE 2: | CodeID | OTHER REMOTE DATA |
| TV REMOTE 3: | CodeID | OTHER REMOTE DATA |
| TV REMOTE 4: | CodeID | OTHER REMOTE DATA |
| TV REMOTE 5: | CodeID | OTHER REMOTE DATA |
| TV REMOTE 6: | CodeID | OTHER REMOTE DATA |
| TV REMOTE 7: | CodeID | OTHER REMOTE DATA |
| TV REMOTE n: | CodeID | OTHER REMOTE DATA |

FIG.11

| | CodeID | JUMPCODE |
|---|---|---|
| TV REMOTE 0: | 2 | 1 |
| TV REMOTE 1: | 4 | 0 |
| TV REMOTE 2: | 5 | 0 |
| TV REMOTE 3: | 6 | 0 |
| TV REMOTE 4: | 7 | 2 |
| TV REMOTE 5: | 10 | 1 |
| TV REMOTE 6: | 12 | 1 |
| TV REMOTE 7: | 14 | 5 |
| TV REMOTE n: | 20 | 0 |

FIG.12

| PHYSICAL REMOTE 0 | |
|---|---|
| KEY MAPPING | A |
| FREQUENCY | B |
| PROTOCOL | D |
| HIGH TIMES | A |
| LOW TIMES | C |
| GENERAL COMMAND INFO | A |

| PHYSICAL REMOTE 1 | |
|---|---|
| KEY MAPPING | B |
| FREQUENCY | B |
| PROTOCOL | D |
| HIGH TIMES | A |
| LOW TIMES | A |
| GENERAL COMMAND INFO | B |

| PHYSICAL REMOTE 2 | |
|---|---|
| KEY MAPPING | C |
| FREQUENCY | C |
| PROTOCOL | A |
| HIGH TIMES | C |
| LOW TIMES | B |
| GENERAL COMMAND INFO | C |

| PHYSICAL REMOTE 3 | |
|---|---|
| KEY MAPPING | C |
| FREQUENCY | C |
| PROTOCOL | A |
| HIGH TIMES | C |
| LOW TIMES | B |
| GENERAL COMMAND INFO | D |

| PHYSICAL REMOTE 4 | |
|---|---|
| KEY MAPPING | A |
| FREQUENCY | C |
| PROTOCOL | A |
| HIGH TIMES | C |
| LOW TIMES | C |
| GENERAL COMMAND INFO | E |

FIG. 16

| HAS PARENT | HAS MASK | PROPERTY MASK | | | | | | | HAS DATA | | | | | |
|---|---|---|---|---|---|---|---|---|---|---|---|---|---|---|
| | | KEY_MAPPING_BIT | FREQUENCY_INDEX_BIT | PROTOCOL_TYPE_BIT | HIGHTIME_TABLE_BIT | LOWTIME_TABLE_BIT | GENERAL_COMMAND_BIT | | HAS KEY MAPPING | HAS FREQUENCY | HAS PROTOCOL | HAS HIGH TIMES | HAS LOW TIMES | HAS GENERAL COMMAND INFORMATION |
| 0 | 0 | - | - | - | - | - | - | | 1 | 1 | 1 | 1 | 1 | 1 |
| 0 | 1 | X | X | X | X | X | X | | X | X | X | X | X | X |
| 1 | 0 | - | - | - | - | - | - | | 0 | 0 | 0 | 0 | 0 | 0 |
| 1 | 1 | X | X | X | X | X | X | | X | X | X | X | X | X |

FIG.21

| PHYSICAL REMOTE 0 | | |
|---|---|---|
| EMBEDDED KEY NUMBER | KEY | PATTERN |
| 0 | POWER | A0 |
| 1 | SELECT | A1 |
| 2 | UP ARROW | A2 |
| 3 | DOWN ARROW | - |
| 4 | VOLUME UP | - |
| 5 | VOLUME DOWN | B5 |
| 6 | MENU | B6 |

| PHYSICAL REMOTE 1 | | |
|---|---|---|
| EMBEDDED KEY NUMBER | KEY | PATTERN |
| 0 | POWER | A0 |
| 1 | SELECT | A1 |
| 2 | UP ARROW | A2 |
| 3 | DOWN ARROW | - |
| 4 | VOLUME UP | C4 |
| 5 | VOLUME DOWN | D5 |
| 6 | MENU | D6 |

| PHYSICAL REMOTE 2 | | |
|---|---|---|
| EMBEDDED KEY NUMBER | KEY | PATTERN |
| 0 | POWER | B0 |
| 1 | SELECT | B1 |
| 2 | UP ARROW | A2 |
| 3 | DOWN ARROW | D3 |
| 4 | VOLUME UP | - |
| 5 | VOLUME DOWN | D5 |
| 6 | MENU | A6 |

FIG.22

| PHYSICAL REMOTE 0 | | | | | | | |
|---|---|---|---|---|---|---|---|
| EMBEDDED KEY NUMBER | 6 | 5 | 4 | 3 | 2 | 1 | 0 |
| KEY MAPPING | 1 | 1 | 0 | 0 | 1 | 1 | 1 |
| PATTERNS | B6 | B5 | - | - | A2 | A1 | A0 |
| COMMANDS | POWER | | | | | | |
| | SELECT | | | | | | |
| | UP ARROW | | | | | | |
| | VOLUME DOWN | | | | | | |
| | MENU | | | | | | |

| PHYSICAL REMOTE 1 | | | | | | | |
|---|---|---|---|---|---|---|---|
| EMBEDDED KEY NUMBER | 6 | 5 | 4 | 3 | 2 | 1 | 0 |
| KEY MAPPING | 1 | 1 | 1 | 0 | 1 | 1 | 1 |
| PATTERNS | D6 | D5 | C4 | - | A2 | A1 | A0 |
| COMMANDS | POWER | | | | | | |
| | SELECT | | | | | | |
| | UP ARROW | | | | | | |
| | VOLUME UP | | | | | | |
| | VOLUME DOWN | | | | | | |
| | MENU | | | | | | |

| PHYSICAL REMOTE 2 | | | | | | | |
|---|---|---|---|---|---|---|---|
| EMBEDDED KEY NUMBER | 6 | 5 | 4 | 3 | 2 | 1 | 0 |
| KEY MAPPING | 1 | 1 | 0 | 1 | 1 | 1 | 1 |
| PATTERNS | A6 | D5 | - | D3 | A2 | B1 | B0 |
| COMMANDS | POWER | | | | | | |
| | SELECT | | | | | | |
| | UP ARROW | | | | | | |
| | DOWN ARROW | | | | | | |
| | VOLUME DOWN | | | | | | |
| | MENU | | | | | | |

FIG.23

| KEY | PATTERN | PROTOCOL |
|---|---|---|
| POWER | POWER1 | X |
| SELECT | SELECT1 | X |
| | SELECT2 | X |
| | SELECT3 | X |
| | SELECT4 | Y |
| | SELECT5 | Y |
| UP ARROW | UP ARROW1 | X |
| DOWN ARROW | DOWN ARROW1 | X |

FIG.25

| CHILD REMOTE | |
|---|---|
| KEY MAPPING | .....1111 |
| COMMAND REPETITION INFO | |
| COMMAND_REPETITION_EXISTS | 1 |
| NR_COMMAND_REPETITIONS | 1 |
| POSITION | 1 |
| NR_COMMANDS | 3 |
| HAS_COMMANDS_IN_PARENT | 1 |
| COMMANDS: | POWER1 |
| | SELECT1 |
| | SELECT2 |
| | SELECT3 |
| | UP ARROW1 |
| | DOWN ARROW1 |

| PARENT REMOTE | |
|---|---|
| KEY MAPPING | .....0010 |
| COMMAND REPETITION INFO | |
| COMMAND_REPETITION_EXISTS | 1 |
| NR_COMMAND_REPETITIONS | 1 |
| POSITION | 1 |
| NR_COMMANDS | 2 |
| HAS_COMMANDS_IN_PARENT | 0 |
| COMMANDS: | SELECT4 |
| | SELECT5 |

FIG.26

UNIVERSAL REMOTE CONTROL DEVICE

RELATED APPLICATIONS

This application claims the benefit of European Application No. 08165844.5, entitled, "A UNIVERSAL REMOTE CONTROL DEVICE", filed Oct. 3, 2008, which is hereby incorporated herein by reference in its entirety.

TECHNICAL BACKGROUND

U.S. Pat. No. 4,774,511 describes a universal remote control unit which is able to control a number of different devices such as, a TV, a VCR, a disc player and an audio system. US 2008/0158038 describes the "TV-B-Gone" device which is able to power off TV sets made by different manufacturers.

There is a need for a universal remote control device which can be programmed to fully operate different brands of televisions, for example, and/or can be used to control other types of devices, such as recording devices, and set top boxes, which are used in conjunction with a TV. However, presently the universal remote control devices which are available are either limited in the number of different components they can be programmed to control or, as in the "TV-B-gone" device, are limited in the control functions they can provide.

Overview

According to a first aspect of the present invention there is provided a universal remote control device having a user interface, and transmission means for transmitting commands to electronic devices, the universal remote control device comprising processing means and associated memory, wherein, to enable the universal remote control device to provide commands to operate a plurality of electronic devices, a database is stored in the memory, the database containing control data which has been collected from a plurality of individual, physical remote control units, where each individual remote control unit is arranged to operate a respective one of the electronic devices, and wherein control data which is common to a number of the physical remote control units is stored in virtual remote structures in the database, and wherein a physical remote structure which corresponds to a selected one of the physical remote control units stores control data specific to that physical remote control unit and is linked to appropriate ones of the virtual remote structures whereby all the control data for that physical remote control unit can be retrieved.

Embodiments of the invention seek to store all of the control data necessary to ensure that the functionality of the universal remote control device is not limited, but to keep the size of the database small so that the memory required can also be kept small. This has led to the use of a database structure, in embodiments of the invention, in which common control data is stored in virtual remote structures which are available to a number of physical remote structures.

In a preferred embodiment, the virtual remote structures and physical remote structures are hierarchically arranged, with the physical remote structures being at the lowest or child level and the virtual remote structures being arranged in one or more upper or parent levels, such that each physical remote structure can inherit control data from one or more parent virtual remote structures.

The use of inheritance in embodiments of the present invention reduces the overall size of the data considerably.

In a preferred embodiment, the control data stored at the lowest or child level has a higher priority than control data stored at a higher or parent level, and it is arranged that on retrieval, any conflicts are resolved by retrieving the highest priority control data.

The provision of specific data for a remote in a child physical remote structure, which is also linked to one or more virtual parent remotes, reduces the size of the control data which has to be stored considerably. Conflicts are resolved by the use of priorities.

However, the physical remote control units, whose functions are to be undertaken by a universal remote control device of the invention may, themselves, have multiple functions and/or multiple protocols. In such a case, the physical remote structure, the child, can be provided with all of the data relating to one protocol, and a parent, virtual remote structure can be provided with additional data which relates to a second protocol. Alternative data can also be stored in the physical and virtual remote structures.

In this scenario, the control data stored at a higher or parent level has a higher priority than control data stored at the lowest or child level and it is arranged that on retrieval, any conflicts are resolved by retrieving the highest priority control data.

The control data determines commands to be transmitted to electronic devices. In an embodiment, if the control data it is required to retrieve for a particular command is absent from the remote structures having the higher priority, the required control data is retrieved from remote structures having a lower priority.

Other methods may be utilized to reduce the physical size of the control data as stored. For example, the size of the control data stored may be reduced by omitting repetitious and/or redundant control data.

In an embodiment, where the universal remote control device has a plurality of keys, and actuation of individual keys is arranged to output commands for transmission to electronic devices, only the commands of keys which output commands for transmission are stored in the database.

Preferably, key mapping is used to indicate which keys output commands.

In a preferred embodiment of a universal remote control device of the invention, where actuation of keys is arranged to output commands for transmission to electronic devices to operate those electronic devices, bit repetition data from the output commands is stored together with data, for each command, as to the bit position and the number of bit repetitions, such that each required output command need not be stored but can be generated from the data stored.

Each individual remote control unit may have an individual identification, for example, "CodeID". Rather than storing each individual identification, which would use a lot of memory, an embodiment of the invention provides that the database stores the identification of a first remote control unit, and then stores only the relative jump from the identification of each remote control unit to the next remote control unit.

Preferably, and again to reduce the amount of information which has to be stored, control data for remote control units is stored in global tables, and the structure and control data for each remote control unit is stored using indexes which point to the control data to be retrieved.

The present invention also relates to a method of providing a universal remote control device, comprising collecting control data for each one of a plurality of individual, physical remote control units, and arranging the collected control data in a database, storing the formed database in a single, universal remote control device, and arranging that the universal remote control device is operable to perform the functions of each one of the physical remote control units of the plurality by selectively retrieving the control data for each one of the physical remote control units from the database, wherein control data which is common to a number of the physical remote control units is stored in virtual remote structures in the database, and wherein a physical remote structure which corresponds to a selected one of the physical remote control units stores control data specific to that physical remote control unit and is linked to appropriate ones of the virtual remote structures whereby all the control data for that physical remote control unit can be retrieved.

In an embodiment, the virtual remote structures and physical remote structures are hierarchically arranged, with the physical remote structures being at the lowest or child level and the virtual remote structures being arranged in one or more upper or parent levels, such that each physical remote structure can inherit control data from one or more parent virtual remote structures.

In an embodiment, the control data stored at the lowest or child level has a higher priority than control data stored at a higher or parent level, and it is arranged that on retrieval, any conflicts are resolved by retrieving the highest priority control data.

Alternatively, the control data stored at a higher or parent level has a higher priority than control data stored at the lowest or child level, and it is arranged that on retrieval, any conflicts are resolved by retrieving the highest priority control data.

In an embodiment, where the control data determines commands to be transmitted to electronic devices, and the control data it is required to retrieve for a particular command is absent from the remote structures having the higher priority, the method further comprises enabling the required control data to be retrieved, in such circumstances, from remote structures having a lower priority.

Preferably, a method of the invention further comprises omitting repetitious and/or redundant control data from the control data stored to reduce the size of the control data stored.

In an embodiment of a method of the invention, where each individual remote control unit has an individual identification, the identification of a first remote control unit is stored in the database, and then only the relative jump from the identification of each remote control unit to the next remote control unit, starting from the first, is stored.

Preferably, control data for remote control units is stored in global tables, and the structure and control data for each remote control unit is stored using indexes which point to the control data to be retrieved.

BRIEF DESCRIPTION OF THE DRAWINGS

Embodiments of the present invention will hereinafter be described, by way of example, with reference to the accompanying drawings, in which:

FIG. 4 shows a table assigning a key number to each key of a remote control unit;

FIG. 5 shows how the keys are mapped;

FIG. 6 is a table of key commands as stored in the database;

FIG. 7 is a table of key commands when keys have multiple events;

FIG. 9 is a table of the command bits obtained from the IR commands of FIG. 8, FIG. 10 shows a table of command bits formed by removing bit repetition data from FIG. 9;

FIG. 11 shows a portion of a TV remote list;

FIG. 12 is a representation of the list of FIG. 11 using jump codes;

FIG. 16 shows examples of five physical remotes;

FIG. 21 shows schematically the properties of a remote;

FIG. 22 shows examples of three physical remotes illustrating the storage of their keys;

FIG. 23 shows the key mapping and commands of the three remotes of FIG. 22 when there is no inheritance;

FIG. 25 shows selected keys of a remote to illustrate the provision of multiple events per key; and FIG. 26 illustrates the storage of multiple events per key, with some of these events using a different protocol to that of other events.

DETAILED DESCRIPTION

Figure 1:
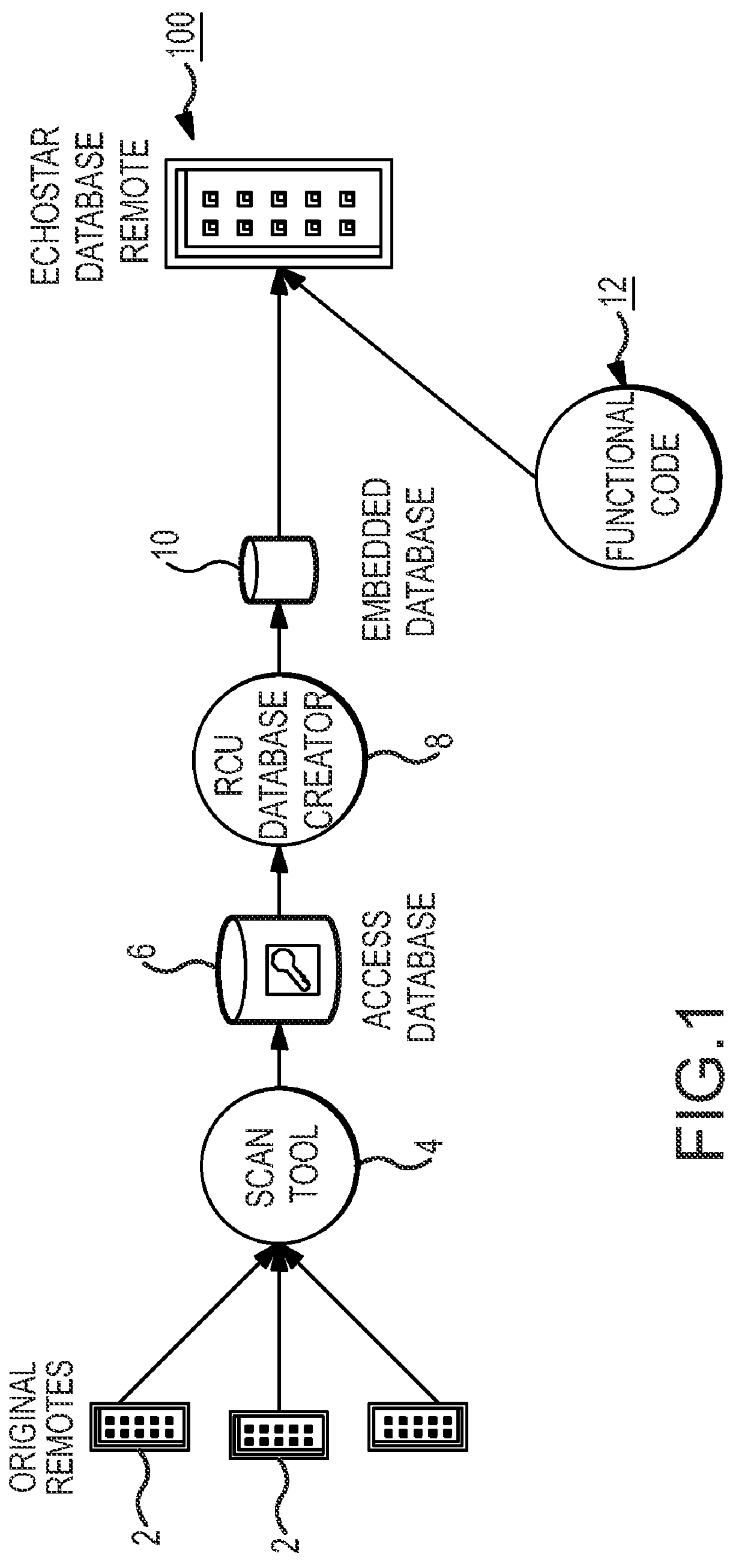
FIG. 1 illustrates schematically the provision of a database formed from control data collected from a plurality of individual, physical remote control units.

Embodiments of the invention provide a universal remote control device which is able to operate different electronic devices, such as television sets, recording devices such as VCRs and DVD recorders, set top boxes and satellite systems, and audio systems. The universal remote control device is also able to operate different manufacturers' versions of such devices. In one embodiment, for example, the universal remote control device is able to provide the functionality of 740 individual remote control units.

It will be appreciated that a universal remote control device implementing the invention may control as few or as many electronic devices as is commercially required, and may control as many or as few types of electronic devices as meets the needs of the marketplace.

A remote control unit communicates with the electronic device it controls by transmitting signals and, presently the majority of remote control units use infrared (IR) transmissions. However, the invention is not limited to the use of infrared transmissions and comprehends remote control units communicating with the electronic devices they control by any other suitable means, for example, by "Bluetooth" ® or by radio frequency transmissions.

To provide a universal remote control device which is not limited in its functionality, as are the presently available devices, it is clearly necessary to store the control data from a very large number of individual, physical remote control units. This data storage is within the universal remote control device.

It is not generally commercially possible just to provide a very large capacity memory within the universal remote control device. Commercial remote control units, for example, typically have ROM memory incorporated therein with a capacity limited to 32 KB. Unfortunately, ROM storage remains relatively expensive and so a viable universal remote control device needs to store the large amount of data necessary without needing to increase the memory capacity. It is therefore proposed to compress the data. Of course, it is then necessary to ensure that decompression of the data is easy and that it does not take too long. An electronic device controlled by a universal remote control device is generally controlled by pressing a key, and the user expects that once a key is pressed there will be a substantially immediate response from the electronic device.

The requirement to compress the data so that it can be stored in a relatively small capacity memory, of course, conflicts with the need to make the data immediately accessible when required.

Embodiments of the invention address these conflicting requirements. In preferred embodiments, not only is the control data to be stored compressed, it is also stored in a specific database structure which utilizes inheritance. This database structure enables a large amount of data to be stored in a small space but yet makes access to that data easy and fast.

The compression techniques utilised, in the main, omit redundant or repeated information. Specific examples of such techniques are illustrated and described. It will be appreciated that any other compression techniques can be additionally, and/or alternatively used.

The various compression techniques are now described with specific reference to IR transmissions. It will be appreciated that different compression techniques might occur to the skilled man if alternative means for transmission are employed.

As explained, a universal remote device 100, as indicated in FIG. 1, is to be able to perform the functionality of a plurality of individual, physical remote control units 2. FIG. 1 illustrates schematically the provision of a database 10 formed from control data collected from the plurality of individual, physical remote control units 2. As shown, a scan tool 4 scans the control data of each of the individual remote control units 2 and places this data into an access database 6. A database creator 8 then retrieves and analyses the data in the access database 6, compresses it, and places it in the structure, described further below, in an embedded database 10. The database 10 is stored in memory in the universal remote control device 100. It will be seen that the universal control device 100 also has a processing unit indicated at 12. This processing unit is arranged to use the data in the embedded database 10 in response to the actuation of keys, indicated at 14 on the remote control device 100, so that appropriate signals are transmitted in response to the key actuation.

Figure 3:
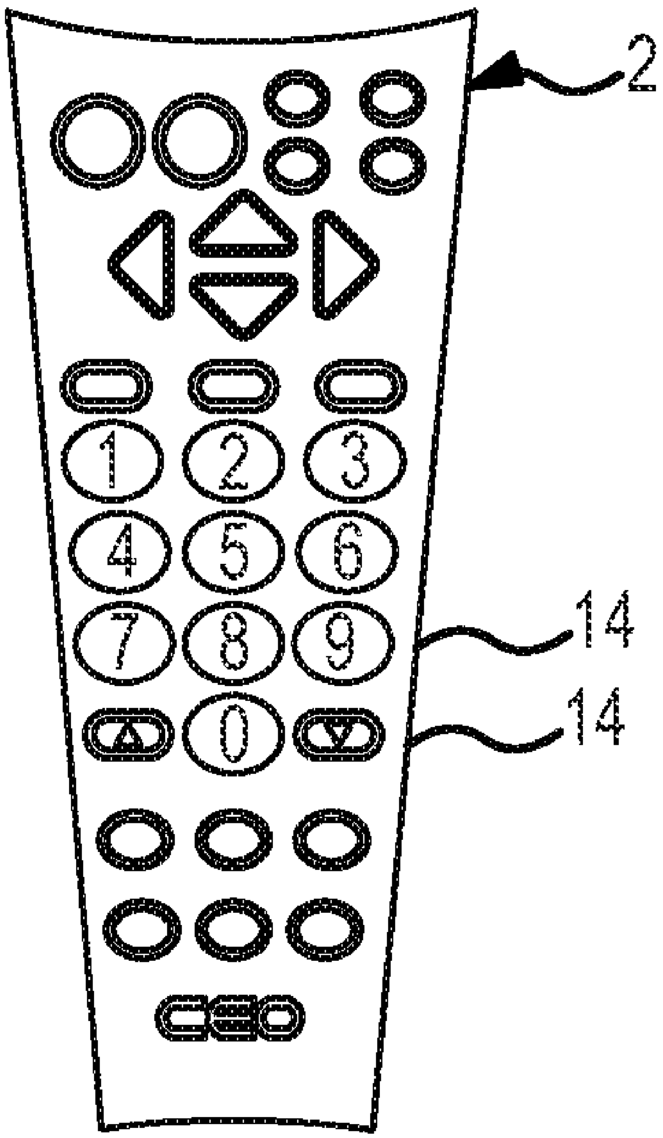
FIG. 3 shows one example of a physical remote control unit.

FIG. 3 shows one example of a physical remote control unit 2 having keys 14. As shown, and as is well known, each key 14 on the remote is named, numbered, or otherwise carries an indication of its function.

Figure 2:
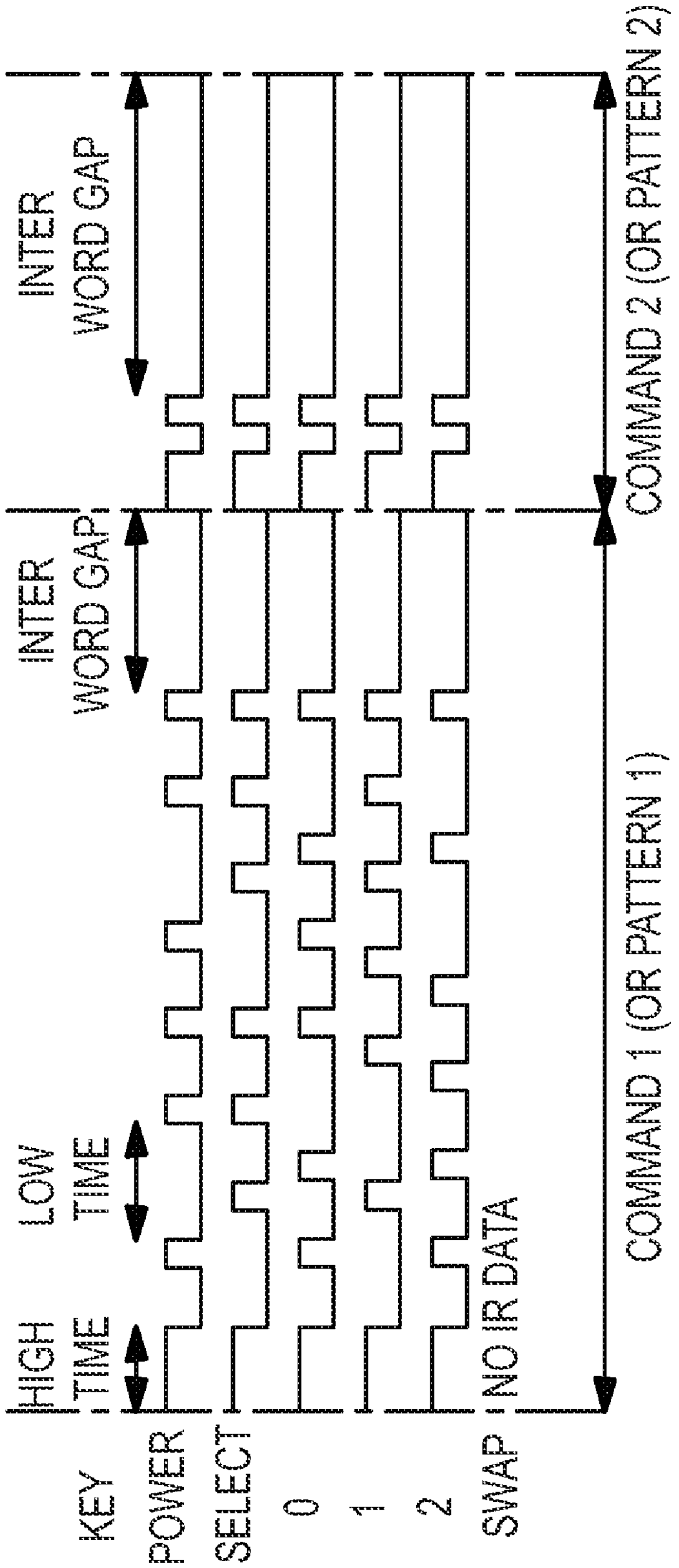
FIG. 2 illustrates IR commands transmitted from a remote control unit.

FIG. 2 shows examples of IR patterns which are transmitted by the remote control unit 2 in response to the actuation of a key 14 by pressing it. FIG. 2 shows the IR pattern or command output from "Power" and "Select" keys, and from "0", "1", and "2" keys of a remote control unit, for example. FIG. 2 also reveals that a "Swap" key does not transmit an IR pattern.

It will be apparent from FIG. 2 that each IR pattern, or command, has a high time and a low time. When the pattern is transmitting a high time, an LED (not shown) in the remote control unit is usually lit. FIG. 2 also shows that an interword gap (IWG) is usually provided between successive commands.

In embodiments, the control data from each remote control unit which needs to be stored is compressed, as discussed above. This can be done by using key mapping. FIG. 4 shows a table assigning a key number to each key of a remote control unit. FIG. 5 illustrates how the keys are mapped.

Key mapping is used to indicate which keys of a physical remote control unit 2 generate IR patterns. As is shown, each key is given a number or position (FIG. 5) and a flag is set for each position. When the flag is set to 1 this indicates that the key, when pressed, transmits an IR pattern or command. When the flag is set to 0, this indicates that operation of that key does not send out an IR pattern or command. Thus, from FIGS. 4 and 5 it can be seen that the "Power" key at position 0 has a flag set to 1 indicating that its actuation generates a command. The "Up arrow" key at position 2 has a flag set to 0 showing that the "Up arrow" key does not generate an IR pattern.

Only the commands of keys which output IR patterns are stored in the database in the universal remote control device 100. The storage is in order with the lowest "embedded key number" first and the keys with the highest "embedded key number" last. The keys and command numbers which are to be stored are shown in FIG. 6. As can be seen, the "Power" key, which had the lowest embedded key number, that is, 0, is also the first key to have a flag set at 1. The "Power" key is given the first command number 1. Similarly, the next key, the "Select" key, which also has a command, is stored as command number 2. The "Up arrow" and "Down arrow" keys shown in FIG. 4 do not have flags set at 1. Therefore, the next command stored is that of the "Volume up" key which is stored as command number 3 in FIG. 6.

The command number in the table of FIG. 6 indicates where the key is stored in the remote. The command number is not fixed but depends on the key mapping. The position of the command, that is its command number, can be found by counting the number of flags set to 1 as shown in the key mapping of FIG. 5. So, for example, in FIG. 5 if all the flags which are set to 1 are counted commencing at position 0, the command number can be found. In FIG. 5, for example, the tenth flag set to 1 is at position 15, and, from FIG. 4 this is key "4". This is shown in FIG. 6 where command number 10 emanates from key "4".

The command number is not stored in the database but is always calculated. So, for example, the command number of the "Mute" key can be obtained by finding that the embedded number for the "Mute" key in FIG. 4 is 8. The number of flags set to 1 from position 0, up to and including position 8, in FIG. 5, are then counted. It will be seen that there are 5 flags. Thus, the command number of the "Mute" key is 5 as shown in FIG. 6.

In some instances, a remote control unit will have multiple events accessed by pressing the same key. Normally a key event with two commands will send command 1 once, and command 2 unlimited times until the key is released. Thus, both commands belong to the same event and are sent out by one key press, that is, by actuating one key once only.

For example, amplifier devices have different keys to select the input device. A remote control unit for an amplifier may have a key to select the TV as the input device, another key to select the DVD as the input device, and still a further key to select the VCR as the input device. The commands from such keys cannot be placed under "TV" and "VCR" keys of a universal remote control device as such keys are required to change the mode of the universal remote control device and not to send out IR patterns. This situation is dealt with by placing all of these events under a single "Select" key. The first time the "Select" key is pressed, a "Select TV" command is sent, the next time the key is pressed a "Select DVD" pattern is sent, and if the key is pressed again, a "Select VCR" pattern is sent.

When a remote control unit has multiple events under the same key, the key commands can be stored as shown in FIG. 7. In FIG. 7, the "Select" key is used for three different events, and the "Mute" key is used for two different events, for example, to mute the volume of two different linked devices.

It will be appreciated from the above that the data to be stored in the database is reduced by storing only the commands of keys which output IR patterns and by causing the universal remote control device to calculate the command numbers. Another way in which the data to be stored can be reduced in size is by storing bit repetition data rather than every IR pattern.

Figure 8:
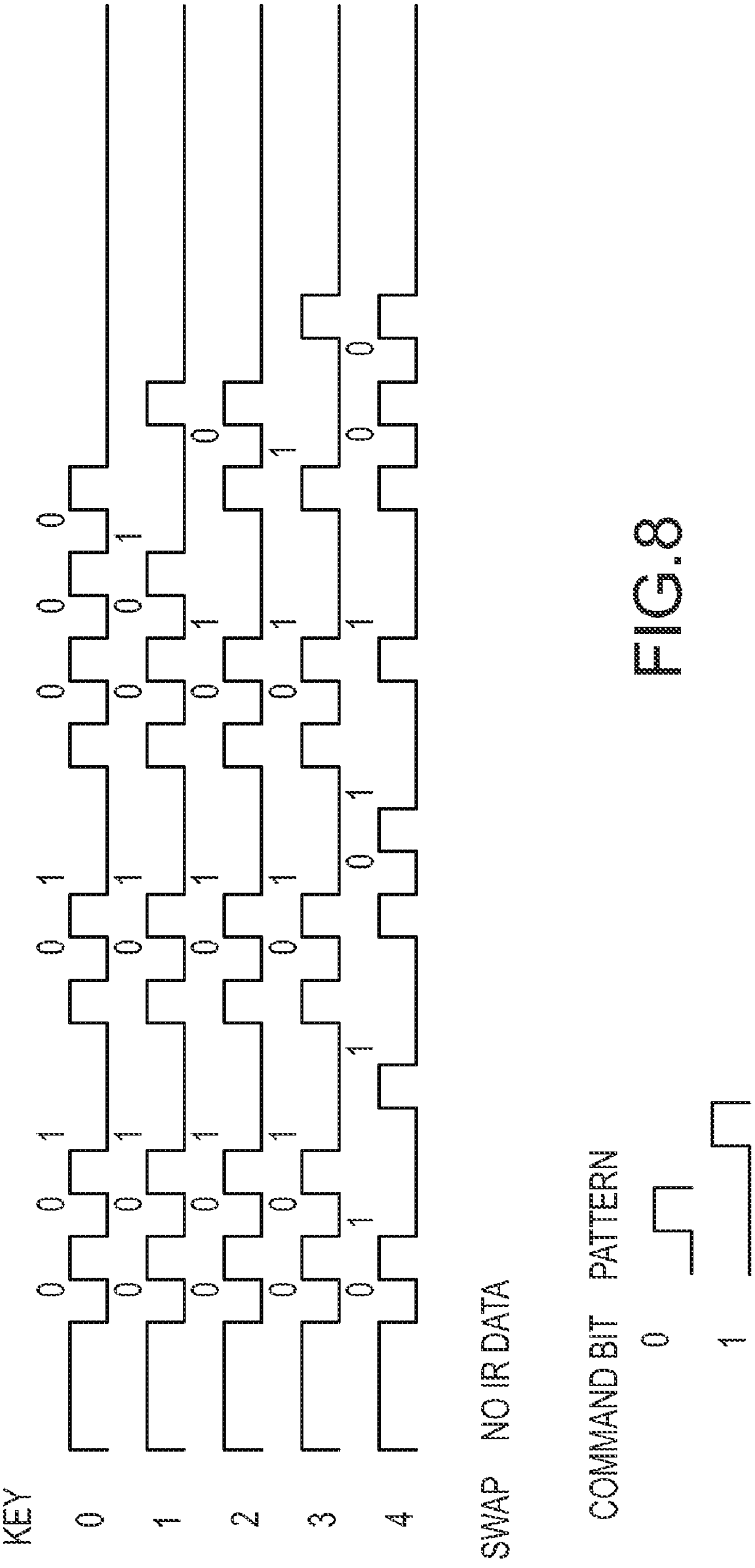
FIG. 8 illustrates IR commands showing the command bits.

FIG. 8 shows the IR data patterns output from keys "0", "1", "2", "3", and "4". It will be seen that these IR patterns are similar to those shown in FIG. 2. However, in FIG. 8 the command bits which the IR patterns represent have been indicated. In FIG. 9, these command bits have been tabulated. It will be seen that the command bits at positions 0, 2, 3 and 4 of FIG. 9 are all identical in all of the IR patterns in FIG. 8. If these bit repetitions are stored then, for each command, it is necessary only to store the position of each bit repetition and the number of bit repetitions. The bit repetitions can then be removed from the commands of FIG. 9 to produce the command table as shown in FIG. 10. It is the command bit information in Table 10, therefore, which is stored in the database together with the bit repetition information. In this manner also, the information to be stored in the database is reduced.

There are other methods of avoiding the storage of repetitious values which will occur to those skilled in the art but which are not described in detail here. However, it is suggested that anything which is repeated should generally be stored only once together with appropriate pointers to the information.

As set out above, the embedded database within the universal remote control device is to store the control data collected from a plurality of individual physical remote control units 2. In one embodiment, this control data is stored in four distinct lists, a TV remote list, a VCR/DVD remote list, an amplifier remote list and a satellite or set top box remote list. All of the remote control units are allocated to one of the lists and their control data placed in the allocated list. Each remote control unit 2 which is operable to control a TV is placed in the TV remote list, a portion of which is illustrated in FIG. 11. As shown, each remote control unit has an identification "CodeID" which identifies that remote. The identification of each TV remote is stored with the necessary control data, "Other remote data", which is information such as its carrier frequency, its key mapping, its high and low times and the like.

It will be appreciated that storing the "CodeID" for every remote control unit would take a lot of memory. Accordingly, the database stores only the relative jump from one "CodeID" to the next as illustrated in FIG. 12.

To obtain the jump codes, the remote control units are sorted on "CodeID" from low to high. The "CodeID" of the first remote in the list is stored as defined in the database, and these definitions are

| |
|---|
| TV_START_JUMP_CODE,<br>VCR_START_JUMP_CODE,<br>TUNER_START_JUMP_CODE, and<br>TUNER_START_JUMP_CODE. |

The "CodeID" of the first remote is:

| |
|---|
| CodeID = X_START_JUMP_CODE<br>X = TV, VCR, TUNER or SAT |

The "CodeID" of the other remotes is:

CodeID next remote=CodeID+JumpCode+1

If the value of the "Code ID" of TV_START_JUMP_CODE is 2, the jump code table shown in FIG. 12 can be generated.

As set out above, it is a waste of memory to store the same information for different remotes, or to store duplicated information from a single remote, a number of times. Many remotes have the same frequency, high times or key mapping which can be stored as common data. Similarly, and as described above, repetitious data, such as particular bit patterns and general command information can be stored only once.

Figure 13:
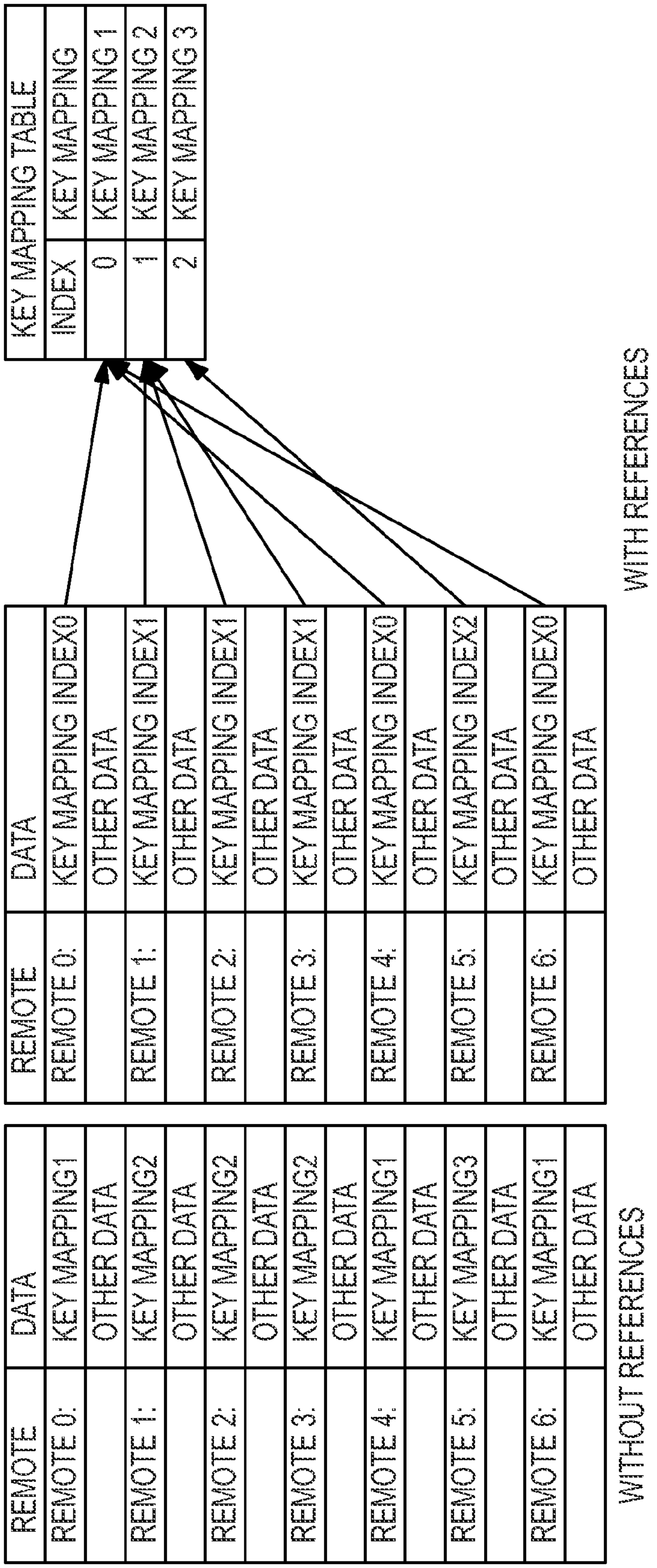
FIG. 13 is an example of the storage of key mappings using indices.

Memory can be saved by storing the key mapping in a global table. To this end, every remote has an index which refers to an entry in the key mapping table. Less memory is required to store an index than to store the key mapping.

Where many remotes have the same data, their key mappings can be stored using indexes as shown in FIG. 13.

Let us assume that there are 740 individual physical remote control units, the key mapping size is 47 bits, and the number of distinct key mappings is 243.

A reference to one of these 243 key mappings can be stored into 8 (log 2 (243)) bits. Per remote only 8 bits are needed, instead of the 47 bits for the real key mapping.

The size that is needed to store the key mappings is shown in the examples below. The first example does not use a key mapping table, and the second example makes use of the key mapping table.

Size without a key mapping table:

| |
|---|
| Size = Number of remotes * key mapping size<br>Size = 740 * 47<br>Size = 34780 bits |

Size with a key mapping table:

| |
|---|
| Size = (Number of remotes * key mapping index size) +<br>(number of distinct mappings * key mapping size)<br>Size = (740 * 8) + (243 * 47)<br>Size = 17341 bits |

It will be seen that the total size is halved when using the global key mapping tables.

Figure 14:
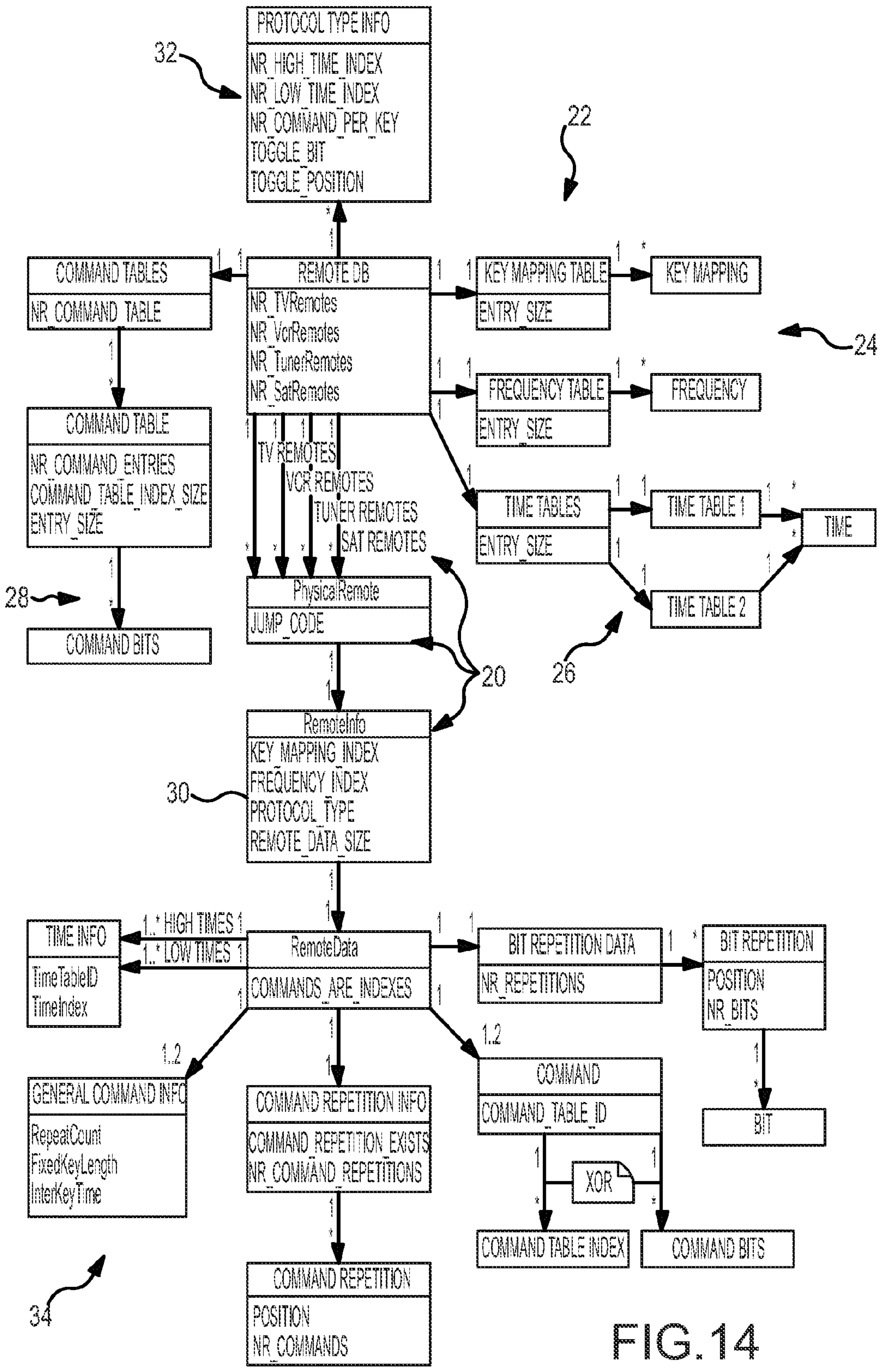
FIG. 14 shows one example of the structure of a database of the invention.

As set out above, the control data which is to be stored in the database 10 is to be stored, for example, as command bits, remote lists, key mappings, and frequency, timing and other data about the remotes. Indexes are used to access the data. FIG. 14 shows one embodiment of a structure of the database. As is shown in FIG. 14, remote information, generally indicated at 20, includes the remote lists of FIG. 11, the jump codes of FIG. 12 and an index to the key mapping. Global tables store the key mapping information 22, frequency information 24, timing information 26, and the command bits 28. General command information is stored in tables 34 and protocol type information is stored in a table 32.

As described above, the remote information 20 includes four remote lists which contain the control data for four types of physical remotes identified using jump codes. As shown in FIG. 14, there is also a "RemoteInfo" structure 30 for each list. This "RemoteInfo structure" 30 includes an index to the key mapping, an index to the frequencies of the remote, a protocol type and a remote data size.

Every physical remote control unit 2 belongs to a protocol. The protocol type information, which is set out in table 32, is needed to convert the high times, low times and command bits to an IR pattern. The protocol properties are stored in the table 32. Every protocol also has a "protocol state diagram", which is not shown in FIG. 14, but which is needed to generate the IR pattern.

Properties that are the same for every IR pattern to be generated are placed in the "General Command Info" structure 34. These variables include the repeat count, the fixed key length and the interkey time. The repeat count indicates how many times the command must be repeated when the key is pushed continuously. The fixed key length and the interkey time are used to define the interword gap (IWG).

The key mapping and the command information which is stored in the database structure of FIG. 14 is as described above.

Figure 15:
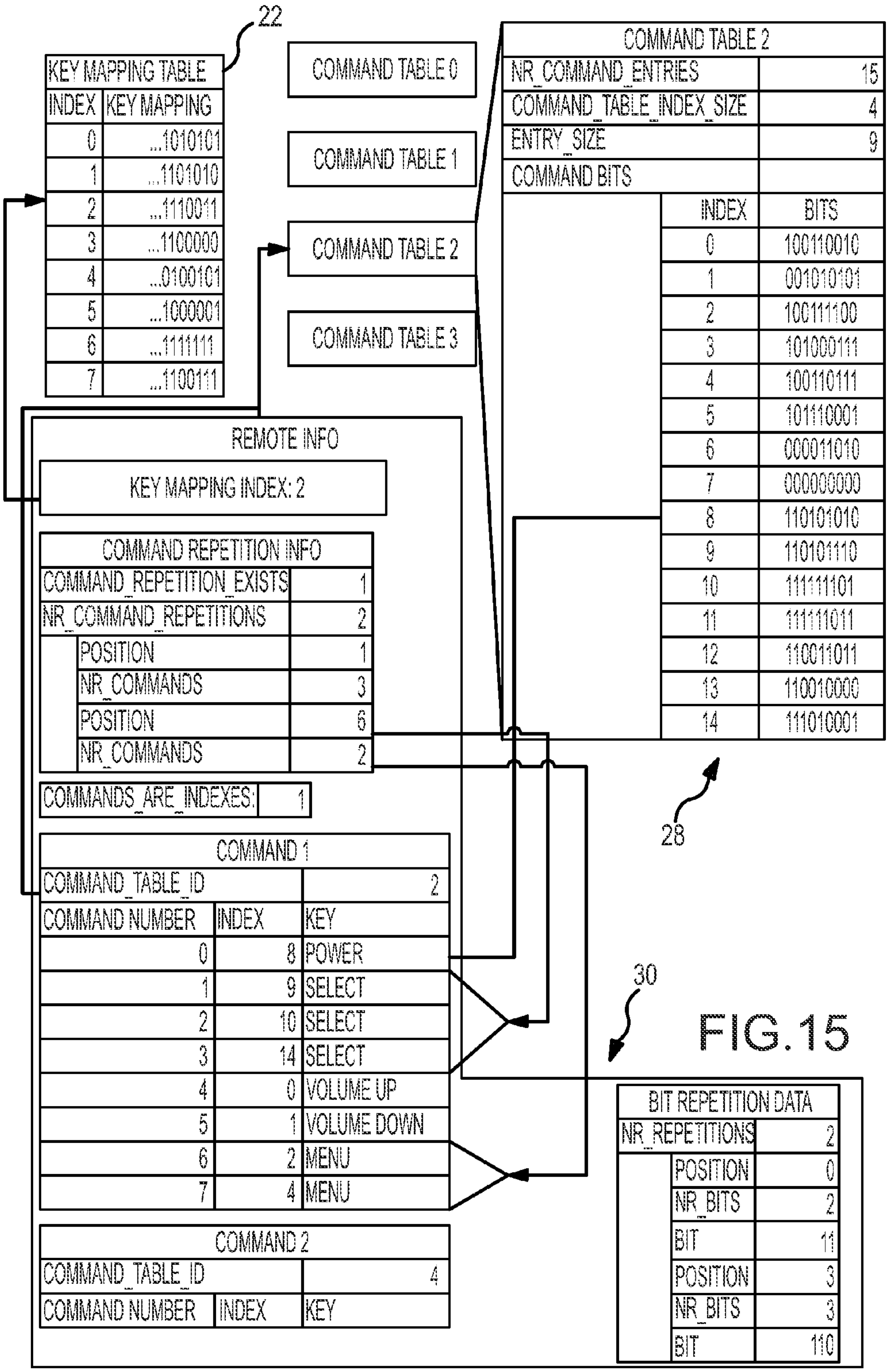
FIG. 15 illustrates the information needed to obtain the command bits of a pressed key.

FIG. 15 illustrates the information needed to obtain the command bits of a pressed key. In order to get the command bits it is necessary to know:

Is the key available?

What is the command position?

Where are the command bits stored?

Has the command "bit repetition data"?

Is the Key Available?

The "Key mapping" table 22 indicates which keys are available. Each remote has an index in the "RemoteInfo" table 30 which refers to a "Key mapping". When the "Key mapping" flag of the pressed key is "1", the key is available. Otherwise the remote does not have the key.

What is the Command Position?

The "Key mapping" and "Command Repetition Info" are needed to get the position, that is, the command number, of the pressed key. The "Key mapping" indicates which keys are available. The "Command Repetition Info" indicates which keys have multiple events.

Where are the Command Bits Stored?

As shown in FIG. 15, the command bits can be stored in the remote or in a command table 28. In this example, the bits are stored in the command table. Because the flag "Commands are Indexes" is "1", the "Command_Table_ID" is "2". This means that the command bits are stored in command table 2 (28). Every key event has an index to a command in the command table. The "Power" event has command 8 and the third "Select" event has command 14.

The "Command_Table_ID" of "Command 2" is "4". This looks strange, because there is no command table 4. When the "Command_Table_ID" is equal to the number of command tables this means that "Command 2" does not have command bits. This remote does not have command bits for the second command.

As described above, some remotes contain the real command bits, and not indexes to command bits as described above. These command bits are stored at the same position as where, in this example, the command indexes are stored. The remotes with real command bits still have a "Command_Table_ID". The command table is needed to get the size of the command bits. The size of the command bits is stored in the "Entry_Size" variable of the command table.

Has the Command "Bit Repetition Data"?

The last question is, has the command "Bit repetition data"? When the remote contains "Bit repetition data", this must be inserted to the command bits.

After this step all command bits are accumulated and can be used to generate the IR pattern.

In the description above, it has been explained how the control data can be reduced in size by omitting redundant or repeated values in the data as shown. An illustrated example of a database structure utilizing pointers and other database techniques to provide access to the stored data has also been described.

A database structure of embodiments of this invention uses a compression method called inheritance. This enables common properties to be communally stored. Inheritance also enables the support of multiple protocols per physical remote control unit.

The control data of individual remote control units is stored in the database as one or more tables. FIG. 16 shows, as an example, five physical remotes as stored in the database, with each remote storing the data from a respective remote control unit. In each remote, the type of key mapping, frequency, protocol, high times, low times, and general command information is identified. It will be seen that physical remotes 0 and 1, for example, have the same high times, whereas physical remotes 2, 3 and 4 have the same frequency and protocol.

Figure 17:
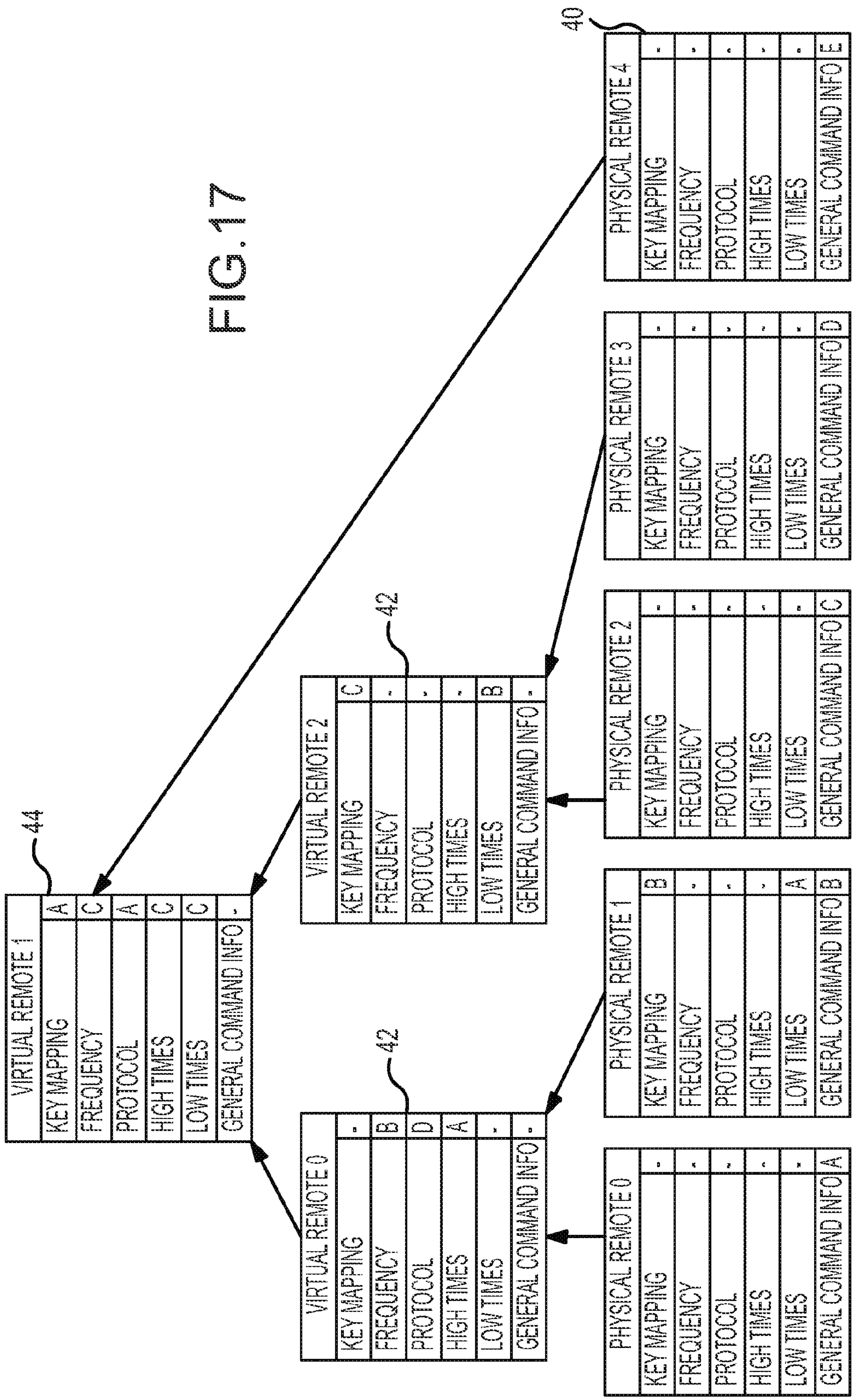
FIG. 17 illustrates the provision of virtual remotes and the linking of physical and virtual remotes.

It is proposed that, additionally, virtual remotes should be provided, as indicated in FIG. 17. As is shown in FIG. 17, control data which is common to two or more physical remotes 40 is stored in selected virtual remotes 42 and 44. The physical remotes 40 are designated as child remotes and each one has a link to a virtual parent remote 42 and/or to a virtual grandparent remote 44.

When it is required to obtain the control data for a physical remote 40, first of all any data in the physical remote 40 itself is obtained, then further data is taken from the parent or the grandparent and so on.

The data of the child, that is of the physical remote 40, has a higher priority than the data of the parent. Thus, in FIG. 17, the physical remote 1 has a key mapping B whilst the grandparent 44 has a key mapping A. The key mapping B is taken for the physical remote 1 because the child data has a higher priority than the parent data.

FIG. 16 shows the data required to define the five physical remotes. It will be seen that as there are six blocks of data for each remote, thirty data blocks have to be stored. The scheme shown in FIG. 17 stores exactly the same information but because the inheritance schema is utilized it will be seen that in FIG. 17 there are only seventeen data blocks to be stored.

Figure 18:
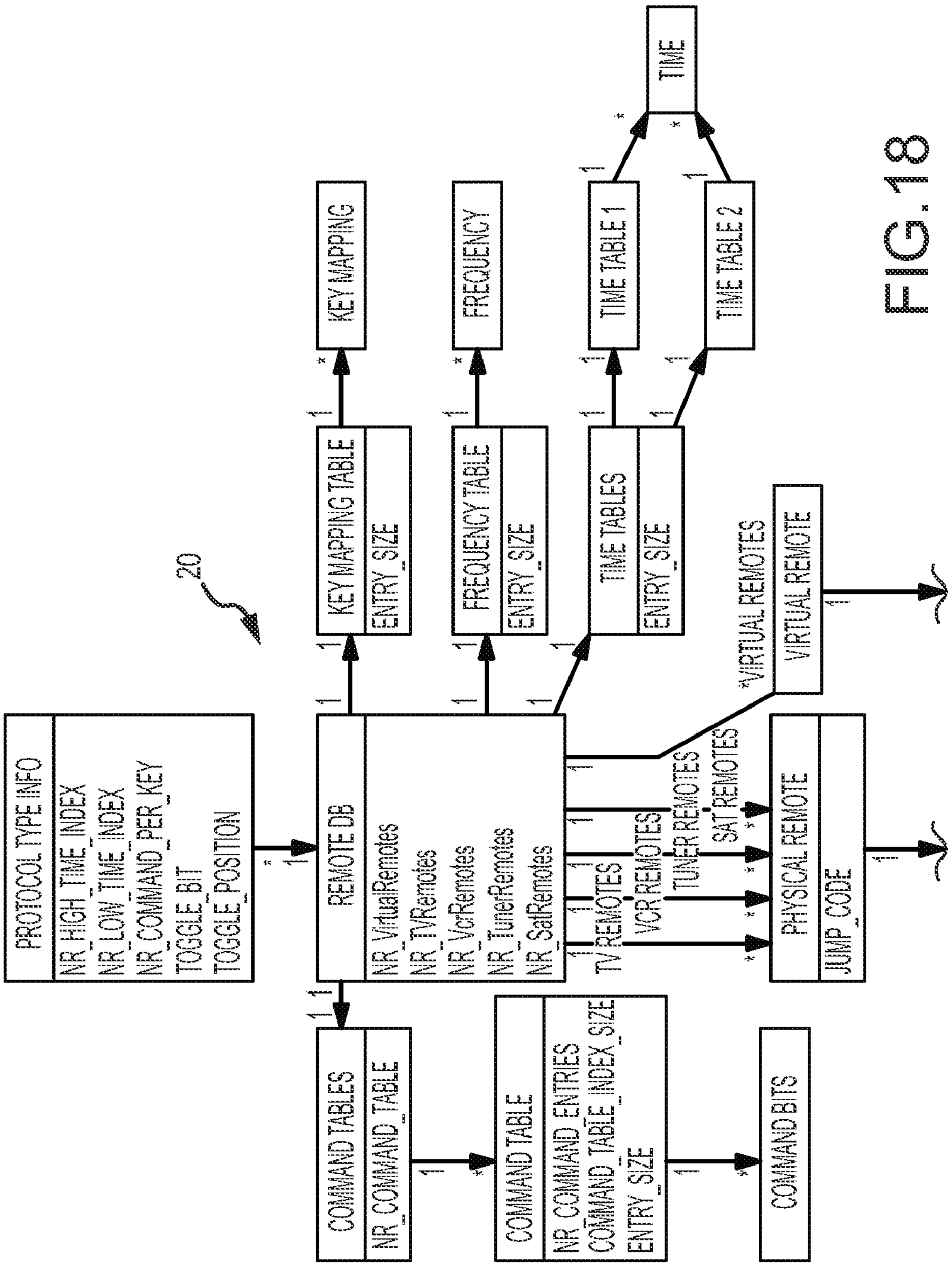
FIG. 18 illustrates a database structure, similar to that of FIG. 14, but with the use of virtual remotes.
Figure 18A:
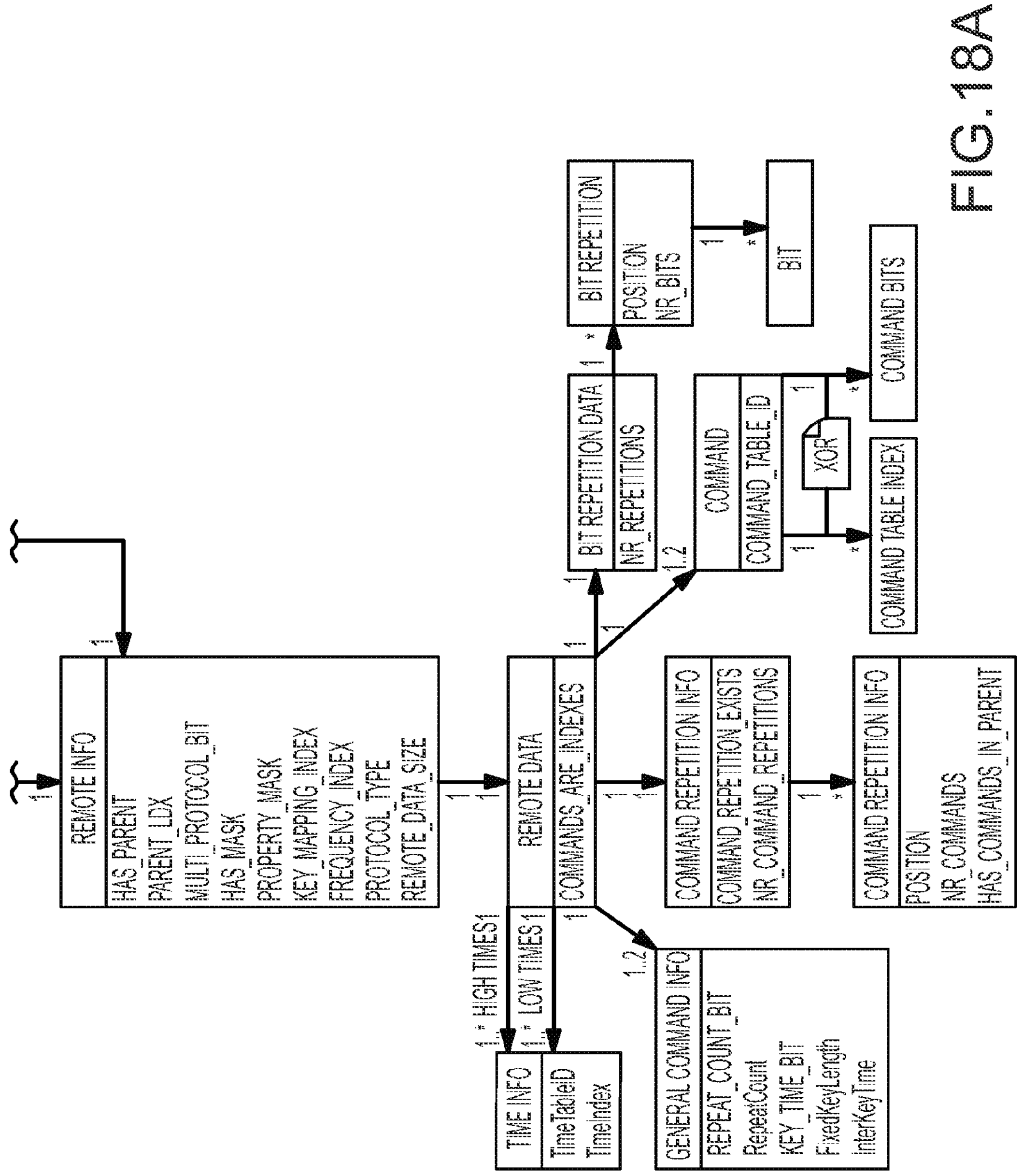

FIG. 14 shows the basic structure of the database. FIG. 18 shows a similarly structured database but with the inheritance variables added. That is, FIG. 18 illustrates the database structure when virtual remotes are utilized.

It will be seen that, in the structure of FIG. 18, a virtual remote list has been added which is referenced by way of the remote information table 20. Similarly, the "RemoteInfo"

table 30 has been extended to include the question "Has this remote a parent?" and to include a parent index which references a virtual remote. The command repetition table, within the General Command Information 34, has also been extended to deal with the situation where commands are within a parent remote.

Figure 19:
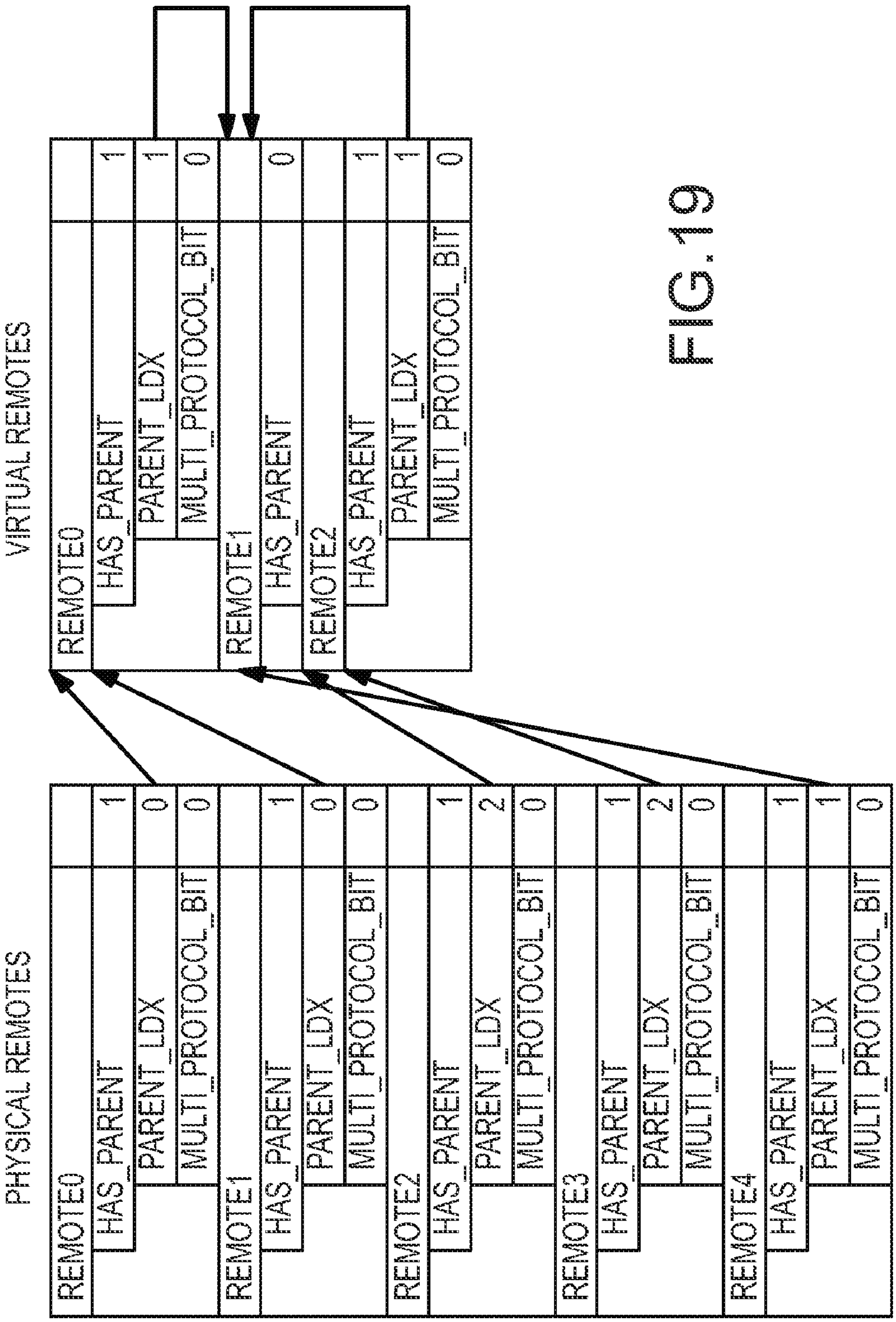
FIG. 19 shows how a physical remote is linked to a parent.

So, if a physical remote has a parent it has an index to this parent. FIG. 19 illustrates how physical remotes are linked to the parent. Thus, for each physical remote a flag "Has_Parent" is set to "1" if the remote has a parent. A parent index "Parent_Idx" identifies the virtual remote which is the parent. Thus, in FIG. 19, physical remotes 0 and 1 have virtual remote 0 as a parent, whereas physical remotes 2 and 3 have virtual remote 2 as a parent.

It will also be seen in FIG. 19 that the physical remotes also have a flag to indicate whether or not the physical remote supports multiple protocols.

Figure 20:
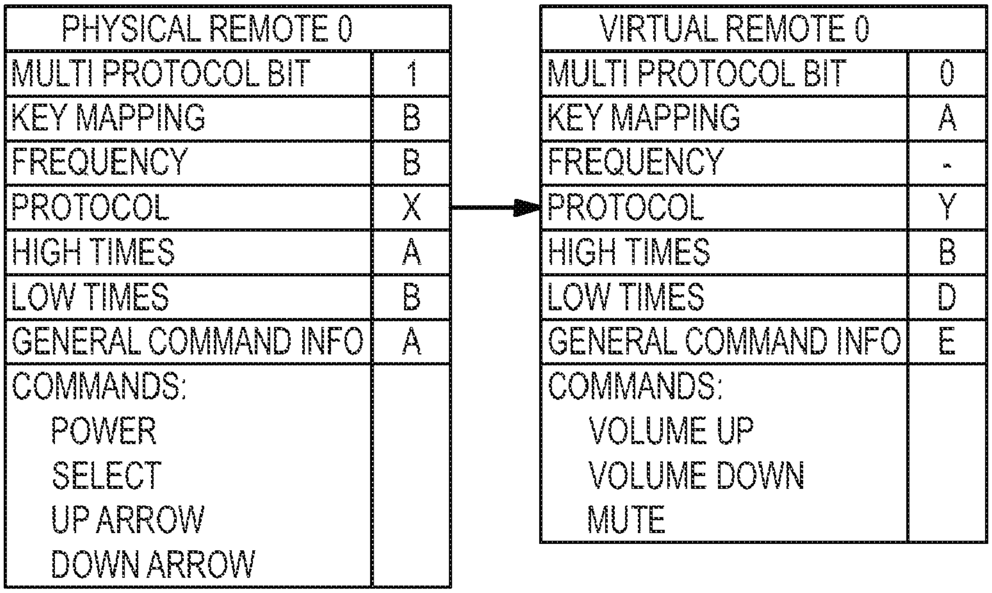
FIG. 20 illustrates a physical remote supporting two protocols, with details of one protocol stored in a linked virtual remote.

Some remotes support multiple protocols. In this case, some keys of the remote will use one protocol, say X, whilst others will use a different protocol, say Y. When the protocol is different the variables are usually different. Thus, the high times, the low times, the interword gap, and the command length vary from protocol to protocol. FIG. 20 shows how multiple protocols can be stored in the database of FIG. 18.

In the arrangement of FIG. 20 the control data of one remote control unit is split into two parts. The first part of the control data is stored as a physical remote with protocol X, whilst the second part of the control data, with protocol Y, is stored in a linked virtual remote. If, in this example, the child remote, namely the physical remote 0, contains all of the information of protocol X, and the virtual parent remote contains all of the data of protocol Y, the "multi_protocol_bit" of the physical child remote is set to 1. When a key of protocol Y is pressed, this key can be found in the parent or virtual remote 0. Then, all of the parent control data, for example the key mapping, the high times, the repeat count etc must be used, even though data for these variables is also available in the child remote. Of course, this only applies for keys which have data stored at the parent remote. If a key is pressed for which not all control data is stored in the parent remote, for example, the frequency as shown in FIG. 20, the control data from the child remote is used. Thus, the control data from the child is used for those properties that are missing from the parent.

There are two rules for inheritance. The normal inheritance rule is that the child data has a higher priority than the parent data. However, and as described above, where there is a multiple protocol, indicated by the setting of a "multi_protocol_bit" to 1, the inheritance rule is changed and the parent data is given a higher priority than that of the child data.

In the arrangement shown in FIG. 20 the "Power", "Select", "Up Arrow" and "Down Arrow" commands belong to protocol X and the commands for these keys are stored in the physical, child, remote 0. The keys "Volume Up", "Volume Down", and "Mute" belong to protocol Y and the commands are stored in parent, virtual remote 0. It will be seen that no frequency is given for virtual remote 0. This means that the frequency of physical remote 0 is used for all the keys.

Some remotes which only have a single protocol might still use the multiple protocol mechanism as indicated in FIG. 20. This can be useful while there are differences in common key properties. For example, it may be that some keys must have unlimited repeats, whilst other keys must only repeat once. The mechanism is useful if the command length is not the same for all keys.

In this situation, all common settings are stored in the child remote and then the child contains the "general command info" for the child's keys and the parent contains the "general command info" for the parent's keys.

There are three data types to indicate which data the remote has. These are the "Has_Parent" flag, the "Has_Mask" flag and the "Property_Mask". The "Has_Parent" flag indicates whether the remote has a parent or not. The "Has_Mask" flag indicates if the remote has a property mask. The property mask is a list of six flags, namely a key mapping bit, a frequency index bit, a protocol type bit, a high time table bit, a low time table bit and a general command info bit. This is shown schematically in FIG. 21. If a flag is "1" the remote has the data belonging to that flag. If the flag is "0" then the remote does not have that property.

Not all remotes have a property mask. Where there is not a property mask the "Has_Parent" flag indicates if the remote has the six properties. When the "Has_Parent" flag is "1" the remote has none of the six properties, and when the "Has_Parent" flag is "0" the remote has all of the six properties.

The keys of the remote can be stored in different remotes. If the key mapping bit is "1" the remote has a key mapping and commands. When two remotes have the same pattern, this pattern can be stored in the parent remote instead of twice in the child remote. If the pattern only belongs to one remote, the pattern is stored in the child remote.

FIG. 22 shows three physical remotes. Only the first seven keys of each remote are shown. FIG. 23 shows the key mapping and commands of the three remotes of FIG. 22 when there is no inheritance. In this example it will be seen that there are multiple remotes with the same pattern. For instance physical remote 0 and physical remote 1 have the same pattern A0 for the "Power" key and all three remotes have the same pattern, A2 for the "Up Arrow" key.

Figure 24:
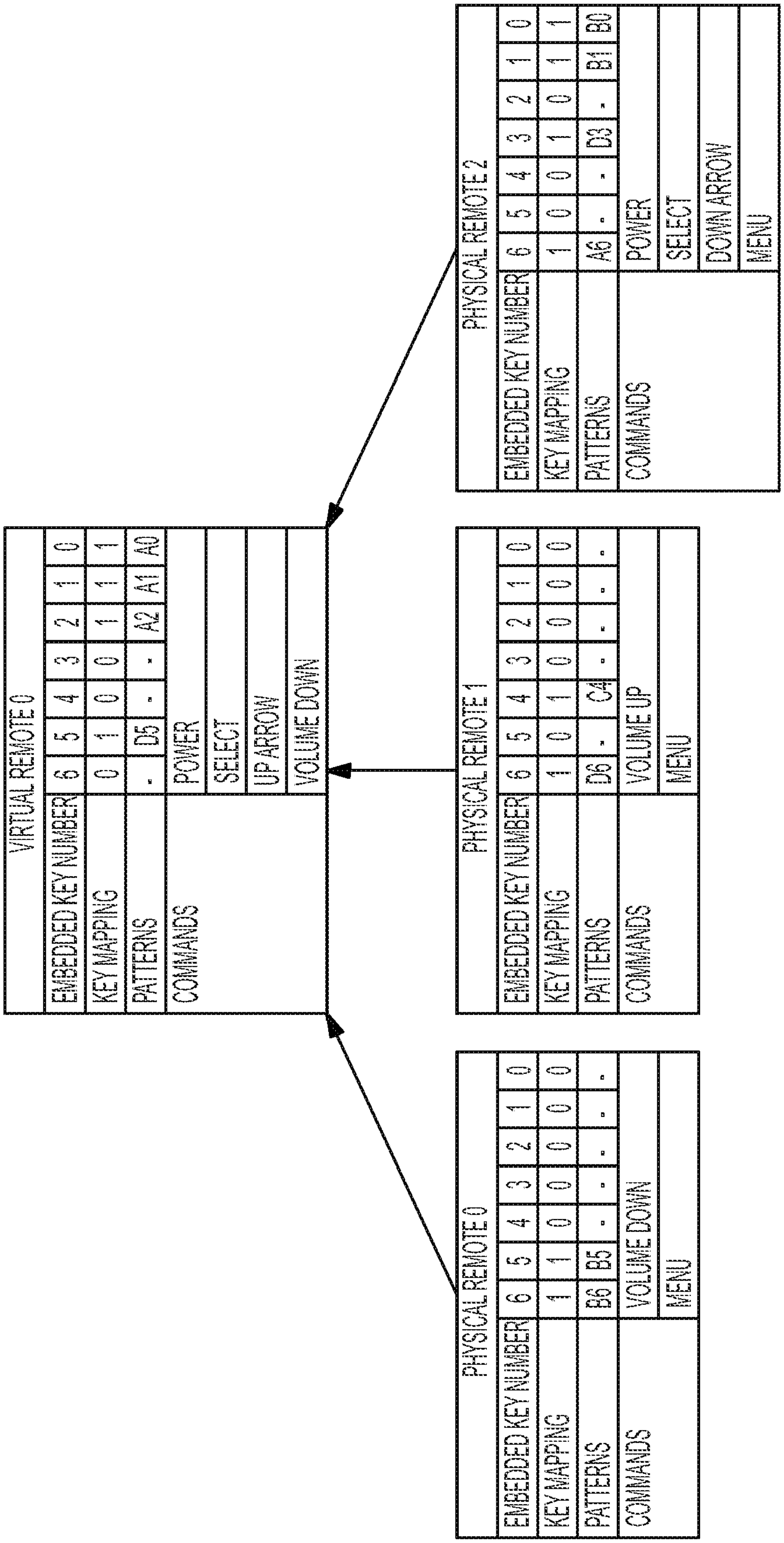
FIG. 24 shows the key mapping and commands of the three remotes of FIG. 23 when there is inheritance.

As indicated in FIG. 24, the patterns that are used in multiple remotes can be stored utilizing one or more virtual remotes and inheritance. This enables the pattern to be stored once instead of multiple times. In the arrangement of FIG. 24 the key mapping is changed for all of the remotes and the common patterns are moved to the virtual, parent remote. When a key is to be pressed, the system looks first in the physical remote for the key mapping. If the key is not in the physical remote then the system looks in the parent, virtual remote. The child remote takes priority over the parent remote such that the "Power" key of physical remote 2 overrules the "Power" key of virtual remote 0.

As set out above, "Command Repetition Info" is used to indicate which keys have multiple events per key. Where the patterns for these events have differing protocols then the patterns with protocol X are stored in the child remote and the patterns with protocol Y are stored in the parent remote. FIG. 25 shows selected keys from a remote to explain this mechanism. In this example the remote is provided with four keys one of which, the "Select" key, is a multiple event key. Two patterns of the "Select" key belong to protocol Y and all of the other patterns of the "Select" key, and indeed of the other keys, belong to protocol X. FIG. 26 illustrates the storage of multiple events per key using a physical, child remote and a virtual parent remote. Some of the events use a different protocol to that of other events and, in this example, the patterns with protocol X are stored in the child remote and the patterns with protocol Y are stored in the parent remote.

In the example shown in FIG. 26, the "Key mapping" indicates which keys the remote has. The child remote has all of the keys whilst the parent remote has only the "Select" key.

The multiple events per the "Select" key are indicated in the flag "Command_Repetition_Exists". The number of multiple event keys is stored in the "Nr_Command_Repetitions". For both of the child and parent remotes these flags are set to "1" because one key (the "Select" key) has multiple events. The "position" is filled with the "embedded key number" of the "Select" key 1 and in the child remote the number of commands is set at three whereas in the parent remote it is set at two.

It will be appreciated that compression of the data in the data structure can be utilized using the inheritance format described above. Other control data which may occur multiple times, such as general command information, can be split between child and parent remotes.

It will be appreciated that variations and modifications to the matters described and illustrated can be made within the scope of the present invention as defined in the appended claims.

The invention claimed is:

1. A universal remote control device comprising:

a user interface;

a transmitter arranged to transmit commands to electronic devices;

a processor coupled with the user interface and the transmitter;

memory associated with the processor; and a database stored in the memory to enable the universal remote control device to provide commands to operate a plurality of electronic devices;

the database containing control data which has been collected from a plurality of individual, physical remote control units, where each individual remote control unit is arranged to operate a respective one of the electronic devices;

wherein the database contains virtual remote structures in which control data which is common to a number of the physical remote control units is stored; and wherein the database contains at least one physical remote structure which corresponds to a selected one of the physical remote control units and stores control data specific to that physical remote control unit, said one physical remote structure being linked to appropriate ones of the virtual remote structures whereby all the control data for that physical remote control unit can be retrieved.

2. A universal remote control device according to claim 1, wherein the virtual remote structures and the physical remote structures are hierarchically arranged, with the physical remote structures being at the lowest or child level and the virtual remote structures being arranged in one or more upper or parent levels, such that each physical remote structure can inherit control data from one or more parent virtual remote structures.

3. A universal remote control device according to claim 2, wherein the control data stored at the lowest or child level has a higher priority than control data stored at a higher or parent level, and wherein the processor is arranged to retrieve control data to provide commands, the processor being arranged such that on retrieval, any conflicts are resolved by retrieving the highest priority control data.

4. A universal remote control device according to claim 2, wherein the control data stored at a higher or parent level has a higher priority than control data stored at the lowest or child level, and wherein the processor is arranged to retrieve control data to provide commands, the processor being arranged such that on retrieval, any conflicts are resolved by retrieving the highest priority control data.

5. A universal remote control device according to claim 2, wherein the control data stored at a higher or parent level has a different priority to that stored at the lowest or child level, wherein the processor is arranged to retrieve control data which determines commands to be transmitted to electronic devices, and wherein, if the control data it is required to retrieve for a particular command is absent from the remote structures having the higher priority, the required control data is retrieved from remote structures having a lower priority.

6. A universal remote control device according to claim 1, wherein the size of the control data stored is reduced by omitting repeated or redundant control data.

7. A universal remote control device according to claim 1, wherein the user interface comprises a plurality of keys, actuation of individual keys being arranged to output commands for transmission to electronic devices, and wherein only the commands of keys which output commands for transmission are stored in the database.

8. A universal remote control device according to claim 7, wherein key mapping is used to indicate which keys output commands.

9. A universal remote control device according to claim 1, arranged to output commands for transmission to electronic devices to operate the electronic devices, and wherein the database contains bit repetition data from the output commands which is stored together with data, for each command, as to the bit position and the number of bit repetitions, such that each required output command need not be stored but can be generated from the data stored.

10. A universal remote control device according to claim 1, wherein each individual remote control unit has an individual identification, and wherein the database stores the identification of a first remote control unit, and then stores only the relative jump from the identification of each remote control unit to the next remote control unit.

11. A method of providing a universal remote control device, comprising:

collecting control data for each one of a plurality of individual, physical remote control units, and arranging the collected control data in a database;

storing the database in a single, universal remote control device; and arranging that the universal remote control device is operable to perform the functions of each one of the physical remote control units of the plurality by selectively retrieving the control data for each one of the physical remote control units from the database;

wherein control data which is common to a number of the physical remote control units is stored in virtual remote structures in the database; and wherein control data specific to a selected one of the physical remote control units is stored in a corresponding physical remote structure in the database, the specific control data being linked to appropriate ones of the virtual remote structures whereby all the control data for that physical remote control unit can be retrieved.

12. A method of providing a universal remote control device according to claim 11, further comprising hierarchically arranging the virtual remote structures and the physical remote structures in the database, with the physical remote structures being at the lowest or child level and the virtual remote structures being arranged in one or more upper or parent levels, such that each physical remote structure can inherit control data from one or more parent virtual remote structures.

13. A method of providing a universal remote control device according to claim 12, wherein the control data stored at the lowest or child level has a higher priority than control data stored at a higher or parent level, and it is arranged that on retrieval, any conflicts are resolved by retrieving the highest priority control data.

14. A method of providing a universal remote control device according to claim 12, wherein the control data stored at a higher or parent level has a higher priority than control data stored at the lowest or child level and it is arranged that on retrieval, any conflicts are resolved by retrieving the highest priority control data.

15. A method of providing a universal remote control device according to claim 11, further comprising omitting repetitious and/or redundant control data from the control data stored in the database to reduce the size of the control data stored.

* * * * *